Oct. 29, 1940. F. W. CLOEDY ET AL Re. 21,610
CARBURETOR
Original Filed Jan. 6, 1938
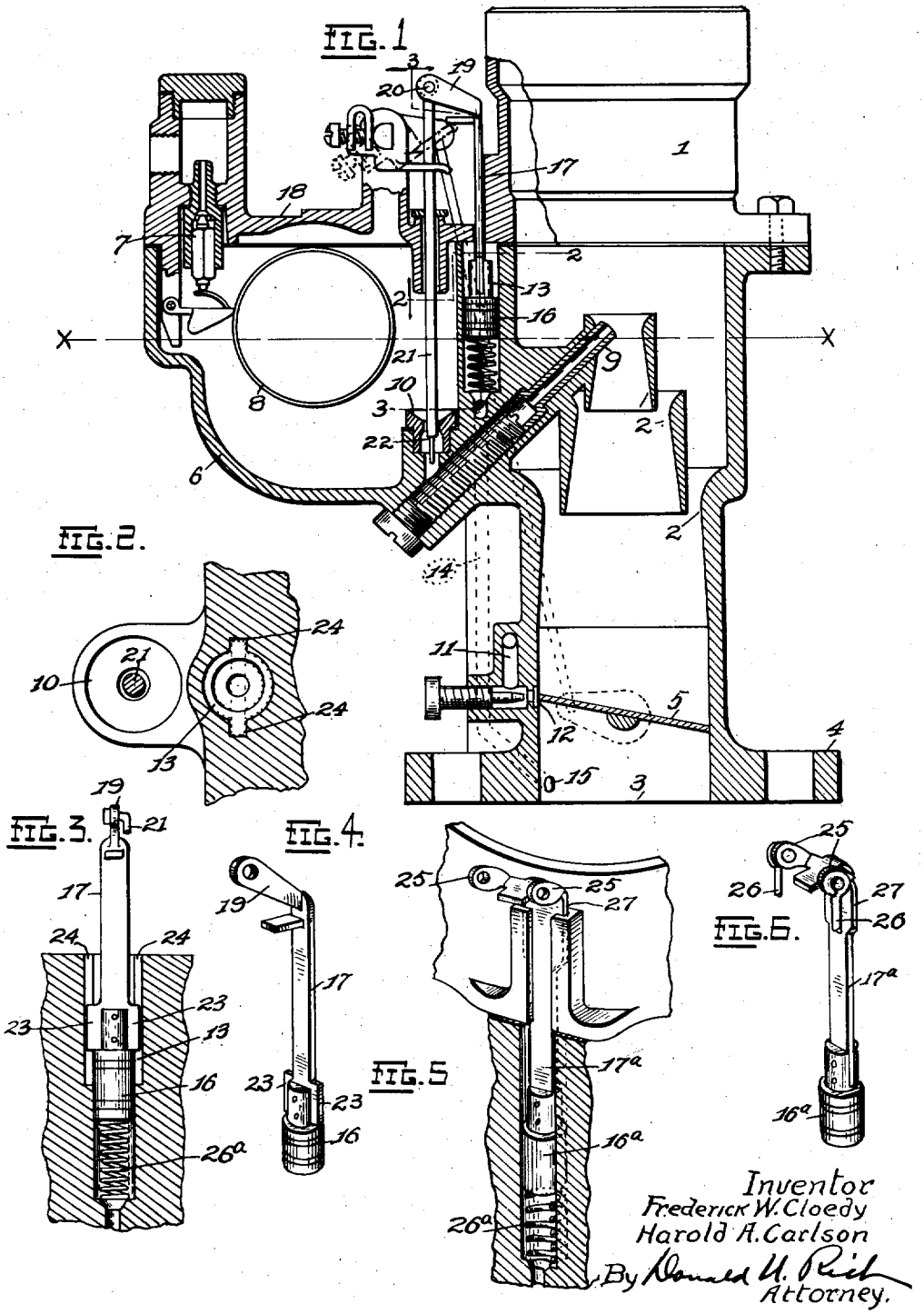

Reissued Oct. 29, 1940

Re. 21,610

UNITED STATES PATENT OFFICE 21,610

CARBURETOR

Frederick W. Cloedy, St. Louis, and Harold A. Carlson, University City, Mo., assignors to Carter Carburetor Corporation, St. Louis, Mo., a corporation of Delaware Original No. 2,191,905, dated February 27, 1940, Serial No. 183,604, January 6, 1938. Application for reissue May 25, 1940, Serial No. 337,282

2 Claims. (Cl. 261—69)

This invention relates to carburetors for internal combustion engines and consists particularly in novel means for stabilizing the fuel metering characteristics thereof.

A well known form of automotive carburetor utilizes a stepped or tapered metering pin associated with the main calibrated fuel metering orifice in the fuel bowl in such a manner as to vary the effective cross sectional area of the orifice to supply a richer or leaner fuel and air mixture according to the demands of the engine. This metering pin may be moved axially with the throttle valve so as to reduce the restricting effect upon the metering orifice as the throttle valve is opened, or it may be controlled by a suction device in a manner to increase the open portion of the metering orifice when the suction in the mixture conduit drops. It has been found that the concentricity or eccentricity of the metering pin relative to the metering orifice has a substantial effect upon the fuel metered therethrough and, accordingly, means should be provided for maintaining the relative position of the pin substantially uniform in this respect. One means of accomplishing this result is illustrated and claimed in a United States Patent No. 1,961,747, issued in the name of William M. Ewart.

One object of the present invention is to provide novel means for maintaining the fuel metering pin in a stable relationship with its metering orifice.

Another object is to provide means for stabilizing the relative position of a fuel metering pin, which means is particularly adaptable for use in carburetors in which the pin is controlled by a suction piston or other suction controlled means.

These objects and other more detailed objects hereafter appearing are attained substantially by the structure illustrated in the accompanying drawing in which Fig. 1 is a side view partly sectioned of a carburetor embodying the invention.

Fig. 2 is a detail horizontal section taken on the corresponding section line of Fig. 1.

Fig. 3 is a detail vertical section taken substantially on the corresponding section line of Fig. 1.

Fig. 4 is a perspective view showing a part of the structure in Fig. 1.

Fig. 5 is a detail view, partly sectioned and partly in perspective, illustrating a modification and Fig. 6 is a perspective view showing a modified detail as in Fig. 5.

The carburetor in Fig. 1 comprises a downdraft mixture conduit including an air inlet horn 1, venturis 2, and outlet portion 3, flanged as at 4 for attachment to the intake manifold (not shown) of an associated internal combustion engine. A throttle valve 5 is pivotally mounted near the outlet portion of the mixture conduit and provided with any suitable manual control means (not shown). Adjacent the mixture conduit is a bowl 6 within which fuel is maintained at a substantially constant level $x—x$ by needle valve mechanism 7, controlled by float 8. Fuel is supplied to the mixture conduit through a main nozzle 9 opening into the throat portion of the smallest venturi 2 and communicating with the fuel bowl through a calibrated metering orifice member 10. Fuel for idling and low speed operation is supplied through a passage, shown in part at 11, opening into the mixture conduit through a port 12 adjacent the edge of the throttle valve when closed.

Formed in the wall of the mixture conduit is a cylinder or chamber 13 communicating through a passage 14 with opening 15 into the mixture conduit posterior to the throttle. Slidable within chamber 13 is a piston 16 having an elongated rod 17 projecting thereabove through cover 18 of the fuel bowl and having at its upper portion a laterally offset arm 19 pinned as at 20 to a metering pin 21 having a stepped lower portion 22 extending into metering orifice member 10 for varying the effective cross-sectional area thereof. A pair of ribs or wings 23 project laterally from the portion of piston rod 17 within chamber 13 and are slidable within slots 24 (Fig. 2) to prevent rotation of piston rod 17 and also guide the rod and pin 21 in their longitudinal movements. Due to the lateral offsetting of the actuating rod 17 from the metering pin, this guiding structure has the effect of maintaining the metering pin substantially uniformly positioned transversely of the metering orifice.

In Figs. 5 and 6, elongated piston rod member 17a projecting above suction controlled piston 16a has a pair of laterally offset arms 25 for carrying a pair of metering pins 26, this arrangement being adapted for use in a dual carburetor having a pair of calibrated metering orifice members in the fuel bowl. Guiding structure 28 formed on air inlet horn 1a slidably receives a closely fitting portion 27 on the upper part of the piston rod for preventing rotation of the rod and maintaining the metering pins uniformly positioned relative to the metering orifices.

In both forms, a spring 26 in the suction chamber constantly urges piston 16a upwardly and may be calibrated to move the smallest portion of the metering pin into operative relationship with orifice member 10 to provide a proper mixture when the suction posterior to the throttle drops below a predetermined value, say three inches of mercury. At other times the metering pin will be drawn down so as to bring a larger portion thereof into the metering orifice to provide an economical mixture for normal, part throttle operation.

The general features of the carburetor shown, with the exception of the fuel metering mechanism, are well known in the art and do not constitute the present invention. The exclusive use of all modifications as come within the scope of the appended claims is contemplated.

We claim:

1. In a carburetor, a mixing conduit, a part having a calibrated fuel metering orifice spaced transversely from the wall of said conduit, a guide opening co-axially arranged with respect to said metering orifice, a metering pin having a reduced lower extremity normally extending into said orifice, a cylindrical chamber in the wall of said conduit communicating at its lower portion with suction in said conduit, a piston in said chamber, a spring arranged in said cylindrical chamber between the piston and the lower end of said chamber, a piston rod projecting upwardly from said piston and having a laterally offset portion forming a mounting for said metering pin for moving the same parallel to the axis of said cylinder to vary the effective cross-sectional area of said orifice, non-circular guide means on the wall of said conduit adjacent said piston rod, said piston rod having a non-circular elongated portion extending laterally therefrom and closely fitting said guide means to prevent rotation of the rod so as to maintain uniform positioning of said pin mounting transversely of the axis of said orifice, whereby the pin is restrained at all times from misalignment with said orifice due to pivotal movement with respect to the wall forming the guide opening.

2. In a carburetor, a mixing conduit, a part having a calibrated fuel metering orifice spaced transversely from the wall of said conduit, a guide opening co-axially arranged with respect to said metering orifice, a metering pin having a reduced lower extremity normally extending into said orifice, a cylindrical chamber adjacent said conduit communicating at its lower portion with suction in said conduit, a piston in said chamber, a spring arranged in said cylindrical chamber between the piston and the lower end of said chamber, a piston rod projecting upwardly from said piston and having a laterally offset portion forming a mounting for said metering pin for moving the same parallel to the axis of said cylinder to vary the effective cross-sectional area of said orifice, and non-circular guide means adjacent said piston rod, said piston rod having a non-circular elongated portion extending laterally therefrom and closely fitting said guide means to prevent rotation of the rod so as to maintain uniform positioning of said pin mounting transversely of the axis of said orifice, whereby said metering pin is restrained at all times from disalignment with said orifice due to pivotal movement with respect to the wall forming the guide opening.

FREDERICK W. CLOEDY.
HAROLD A. CARLSON.